(12) United States Patent
Nadeau et al.

(10) Patent No.: US 8,374,164 B2
(45) Date of Patent: Feb. 12, 2013

(54) DETECTION OF SPECIFIC BFD PATH FAILURES

(75) Inventors: Thomas D. Nadeau, Hampton, NH (US); Danny Prairie, Kanata (CA); George Swallow, Boston, MA (US); Reshad Rahman, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 974 days.

(21) Appl. No.: 11/697,571

(22) Filed: Apr. 6, 2007

(65) Prior Publication Data

US 2008/0247324 A1    Oct. 9, 2008

(51) Int. Cl.
*G01R 31/08* (2006.01)
*H04L 12/28* (2006.01)
(52) U.S. Cl. .................. 370/351; 370/225; 370/389
(58) Field of Classification Search .......... 370/216, 370/225, 245, 351, 395.21, 389, 401
See application file for complete search history.

(56) References Cited

U.S. PATENT DOCUMENTS

| 6,680,943 | B1 | 1/2004 | Gibson et al. | |
|---|---|---|---|---|
| 7,158,524 | B2 | 1/2007 | Buyukkoc et al. | |
| 7,327,683 | B2 * | 2/2008 | Ogier et al. | 370/236 |
| 7,742,400 | B2 * | 6/2010 | Liu | 370/218 |
| 2006/0176809 | A1 * | 8/2006 | Lea et al. | 370/229 |
| 2007/0180104 | A1 * | 8/2007 | Filsfils et al. | 709/224 |
| 2007/0189177 | A1 * | 8/2007 | Zhai | 370/244 |
| 2007/0280102 | A1 * | 12/2007 | Vasseur et al. | 370/225 |

OTHER PUBLICATIONS

Raggarwa, BFD for MPLS LSPs, Jul. 2005, draft-ietf-bfd-mpls-02.txt.*
Swallow, et al, Standards Track, Network Working Group, Avoiding Equal Cost Multipath Treatment in MPLS Networks, Sep. 2005, p. 1-7.
Nadeau at al., BFD Working Group, Bidirectional Forwarding Detection Management Information Base, Oct. 2006, pp. 1-24.
Katz, et al., Network Working Group, Bidirectional Forwarding Detection, Mar. 2007, pp. 1-48.
Katz, et al., Network Working Group, Generic Application of BFD, Mar. 2007, pp. 1-16.
Aggarwal, et al., Network Working Group, BFD for MPLS LSPs, Mar. 2007, pp. 1-12.
Katz., et al, Network Working Group, BFD for Multihop Paths, Mar. 2007, pp. 1-7.
Rosen, et al., Network Working Group., Mulitprotocol Label Switching Architecture, Jan. 2001, pp. 1-61.
Kompella, et al., Network Working Group, Detecting Multi-Protocol Label Switched (MPLS) Data Plane Failures, Feb. 2006, pp. 1-50.
Katz et al., Network Working Group, Bidirectional Forwarding Detection draft-ietf-bfd-base-01.txt, Feb. 2005.

* cited by examiner

*Primary Examiner* — Kevin C Harper
*Assistant Examiner* — Samina Choudhry
(74) *Attorney, Agent, or Firm* — Brinks Hofer Gilson & Lione

(57) ABSTRACT

Improved detection of specific BFD LSP path failures is herein disclosed. The improved detection described herein allow for faster fault isolation of a failure along a LSP path, which in turn may allow for faster repair of the failure. When opening a BFD session with a LSP egress node, the LSP ingress node provides the LSP egress node a path descriptor along with the BFD Discriminator. If a BFD failure is detected at the LSP egress node, the LSP egress node can signal an alarm that includes a full description of the path.

15 Claims, 8 Drawing Sheets

400

410
DISCOVER A PLURALITY OF LSPs BETWEEN A LSP INGRESS NODE AND A LSP EGRESS NODE

412
PERFORM A TREE TRACE TO DISCOVER ALL EQUAL-COST MULTIPLE PATHS FOR A FORWARDING EQUIVALENCE CLASS

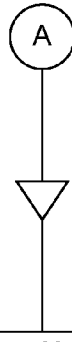

540
FOR EACH OF THE PLURALITY OF LSPS, BOOTSTRAP A BFD SESSION WITH THE LSP EGRESS NODE OF THE LSP, WHEREIN THE BOOTSTRAPPING OF THE BFD SESSION INCLUDES PROVIDING THE LSP EGRESS NODE WITH THE PATH DESCRIPTOR AND THE ASSOCIATED BFD DISCRIMINATOR

542
SEND A LSP PING ECHO-REQUEST CONTAINING THE PATH DESCRIPTOR AND THE ASSOCIATED BFD DISCRIMINATOR TO THE LSP EGRESS NODE

544
PROVIDE THE LSP EGRESS NODE WITH THE PATH DESCRIPTOR IN A TYPE-LENGTH-VALUE ENTRY

546
PROVIDE THE LSP EGRESS NODE WITH THE PATH DESCRIPTOR IN A TYPE-LENGTH-VALUE ENTRY THAT ALSO INCLUDES A FIELD INDICATING THE NUMBER OF NODE DESCRIPTORS IN THE PATH DESCRIPTOR

548
PROVIDE THE LSP EGRESS NODE WITH THE PATH DESCRIPTOR IN A TYPE-LENGTH-VALUE ENTRY THAT ALSO INCLUDES AN ADDRESS-TYPE FIELD INDICATING THE ADDRESS TYPE AND LENGTH OF THE DOWNSTREAM IP ADDRESSES AS WELL AS THE LENGTH OF ANY DOWNSTREAM INTERFACE FIELDS

710
BOOTSTRAP A BFD SESSION WITH A LSP INGRESS NODE OF A LSP, WHEREIN THE BOOTSTRAPPING INCLUDES RECEIVING, FROM THE LSP INGRESS NODE, A PATH DESCRIPTOR FOR THE LSP AND A BFD DISCRIMINATOR ASSOCIATED WITH THE PATH DESCRIPTOR, WHEREIN THE PATH DESCRIPTOR INCLUDES A PLURALITY OF NODE DESCRIPTORS WITH EACH NODE DESCRIPTOR INCLUDING A DOWNSTREAM IP ADDRESS

720
DETECT A FAILURE IN THE BFD SESSION

730
SIGNAL AN ALARM TO INDICATE THE DETECTED FAILURE, WHEREIN THE ALARM INCLUDES THE PATH DESCRIPTOR FOR THE LSP AND THE ASSOCIATED BFD DISCRIMINATOR

810
BOOTSTRAP A BFD SESSION WITH A LSP INGRESS NODE OF A LSP, WHEREIN THE BOOTSTRAPPING INCLUDES RECEIVING, FROM THE LSP INGRESS NODE, A PATH DESCRIPTOR FOR THE LSP AND A BFD DISCRIMINATOR ASSOCIATED WITH THE PATH DESCRIPTOR, WHEREIN THE PATH DESCRIPTOR INCLUDES A PLURALITY OF NODE DESCRIPTORS WITH EACH NODE DESCRIPTOR INCLUDING A DOWNSTREAM IP ADDRESS

812
RECEIVE A LSP PING ECHO-REQUEST CONTAINING THE PATH DESCRIPTOR AND THE ASSOCIATED BFD DISCRIMINATOR FROM THE LSP INGRESS NODE

814
RECEIVE, FROM THE LSP INGRESS NODE, THE PATH DESCRIPTOR IN A TYPE-LENGTH-VALUE ENTRY

816
RECEIVE, FROM THE LSP INGRESS NODE, THE PATH DESCRIPTOR IN A TYPE-LENGTH-VALUE ENTRY THAT ALSO INCLUDES A FIELD INDICATING THE NUMBER OF NODE DESCRIPTORS IN THE PATH DESCRIPTOR

818
RECEIVE, FROM THE LSP INGRESS NODE, THE PATH DESCRIPTOR IN A TYPE-LENGTH-VALUE ENTRY THAT ALSO INCLUDES AN ADDRESS-TYPE FIELD INDICATING THE ADDRESS TYPE AND LENGTH OF THE DOWNSTREAM IP ADDRESSES AS WELL AS THE LENGTH OF ANY DOWNSTREAM INTERFACE FIELDS

DETECTION OF SPECIFIC BFD PATH FAILURES

FIELD OF THE INVENTION

The present disclosure relates generally to failure detection of network paths. For example, the present disclosure can facilitate the detection of which path, among a plurality of paths between a specific LSP ingress router and a specific LSP egress router, has failed.

BACKGROUND OF THE INVENTION

In computer networking and telecommunications, Multi-protocol Label Switching ("MPLS") is a data-carrying mechanism, which emulates some properties of a circuit-switched network over a packet-switched network. MPLS is often used to transport data packets such as those already in the form of Internet Protocol ("IP"). MPLS is an Internet Engineering Task Force initiative that integrates Layer 2 (i.e., the data link layer) information about network links (bandwidth, latency, utilization) into Layer 3 (i.e., the network layer) within a particular autonomous system in order to simplify and improve IP packet exchange. Thus, MPLS operates at an OSI Model layer that is generally considered to lie between traditional definitions of Layer 2 and Layer 3. It can be used to carry many different kinds of traffic, including IP packets, as well as native ATM, SONET, and Ethernet frames. MPLS provides a number of powerful capabilities, such as traffic engineering, etc.

In MPLS, data transmission occurs on Label-Switch Paths ("LSPs"). LSPs are a sequence of labels at each and every node along the path from the source to the destination. Each data packet encapsulates and carries the labels during their journey from source to destination. High-speed switching of data is possible because the fixed-length labels are inserted at the very beginning of the packet or cell and can be used by hardware to switch packets quickly between links.

The Forwarding Equivalence Class ("FEC") to which a packet is assigned is encoded as a short fixed length value known as a "label." With MPLS, incoming packets are assigned with a label when the packets enter a MPLS network. When a packet is forwarded to its next hop, the label is sent along with it; that is, the packets are "labeled" before they are forwarded. At subsequent hops, there is no further analysis of the packet's network layer header. Rather, the label is used as an index into a table, which specifies the next hop, and a new label. The old label is replaced with the new label, and the packet is forwarded to its next hop. In the MPLS forwarding paradigm, once a packet is assigned to a FEC, subsequent routers do no further header analysis; the labels drive all forwarding. This has a number of advantages over conventional network layer forwarding.

Bidirectional Forwarding Detection ("BFD") is a network protocol used to detect forwarding. It provides low-overhead detection of faults even on physical media that don't support failure detection of any kind, such as Ethernet, virtual circuits, tunnels, and MPLS LSPs. BFD establishes a session between two endpoints over one or more links.

One desirable application of BFD is to detect a MPLS LSP data plane failure. LSP-Ping is an existing mechanism for detecting MPLS data plane failures and for verifying the MPLS LSP data plane against the control plane. A combination of LSP-Ping and BFD can be used to provide faster data plane failure detection and/or make it possible to provide such detection on a greater number of LSPs.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

FIG. 4 illustrates additional example operations performable by a LSP ingress node and useful in detecting LSP path failure in accordance with embodiments disclosed herein.

FIG. 5 illustrates additional example operations performable by a LSP ingress node and useful in detecting LSP path failure in accordance with embodiments disclosed herein.

FIG. 7 illustrates example operations performable by a LSP egress node and useful in detecting LSP path failures in accordance with embodiments disclosed herein.

FIG. 8 illustrates additional example operations performable by a LSP egress node and useful in detecting LSP path failures in accordance with embodiments disclosed herein.

DESCRIPTION OF EXAMPLE EMBODIMENTS

Overview

Figure 1:
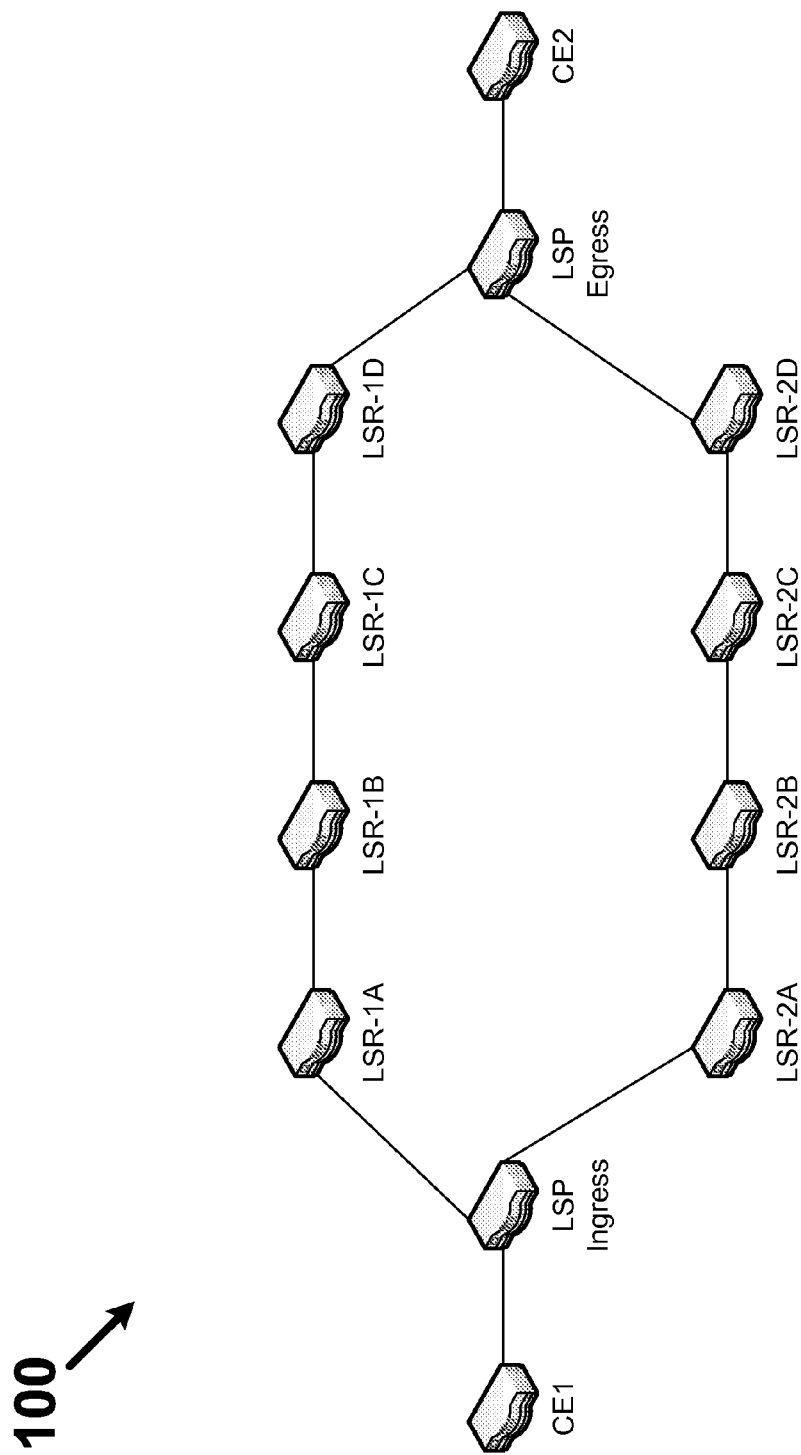
FIG. 1 illustrates an example network comprising a plurality of LSP paths from a LSP ingress node to a LSP egress node.

When running a multihop Bidirectional Forwarding Detection ("BFD") session between a conventional ingress node of the BFD session and a conventional egress node of the BFD session, multiple paths may exist between the ingress node and the egress node. Because of the existence of the multiple paths, an egress node detecting a BFD fault is unaware of which specific path of the multiple paths has experienced the fault. For example, when running multihop Bidirectional Forwarding Detection ("BFD") for Multiprotocol Label Switching ("MPLS") with multiple Label Switched Paths ("LSPs") from a conventional LSP ingress node to a conventional LSP egress node, the BFD session at the conventional LSP egress node is unable to report which specific LSP path has experienced a fault.

Inventive matter discussed herein deviates with respect to and improves upon conventional detection of path failures in a BFD session and other technology known in the prior art. Embodiments described herein allow for faster fault isolation of a failure along a path, such as a LSP, in a BFD session, which in turn may allow for faster repair of the failure.

A first embodiment disclosed herein provides logic encoded in one or more tangible media for execution and, when executed, operable to perform operations useful in detecting specific path failures in a BFD session. The operations can be performed at an ingress node, such as a LSP ingress node, and include discovering a plurality of paths between an ingress node and an egress node. A path descriptor for each of the plurality of paths is then constructed; wherein each path descriptor includes a plurality of node descriptors and each node descriptor includes a downstream IP address. Each path descriptor is then associated with a BFD discriminator that is locally unique to the path's ingress node. For each of the plurality of paths, a BFD session with the path's egress node is bootstrapped, wherein the bootstrapping of the BFD session includes providing the path's egress node with the path descriptor and the associated BFD discriminator.

A second embodiment disclosed herein provides logic encoded in one or more tangible media for execution and, when executed, operable to perform operations useful in detecting specific path failures in a BFD session. The operations can be performed at an egress node, such as a LSP egress node, and include bootstrapping a BFD session with an ingress node of a path, wherein the bootstrapping includes receiving, from the path's ingress node, a path descriptor for the path and a BFD discriminator associated with the path descriptor, wherein the path descriptor includes a plurality of node descriptors and each node descriptor includes a downstream IP address. The logic may then detect a failure in the BFD session. If the logic detects such a failure, the logic may signal an alarm to indicate the detected failure, wherein the alarm includes the path descriptor for the path and the associated BFD discriminator.

It is to be understood that the inventive matter disclosed herein may be embodied as logic encoded in one or more tangible media for execution and, when executed, operable to perform operations disclosed herein. The logic may be embodied strictly as a software program, as software and hardware, or as hardware alone. The features disclosed herein may be employed in data communications devices and other computerized devices and software systems for such devices, such as those manufactured by Cisco Systems, Inc. of San Jose, Calif.

DETAILED DESCRIPTION

FIG. 1 illustrates an example network 100 comprising a plurality of (i.e., multiple) LSPs from a LSP ingress node to a LSP egress node. Two LSPs are shown in FIG. 1. The first LSP comprises, in order, the LSP Ingress node, LSR-1A, LSR-1B, LSR-1C, LSR-1D, and the LSP egress node. The second LSP comprises, in order, the LSP Ingress node, LSR-2A, LSR-2B, LSR-2C, LSR-2D, and the LSP egress node. In particular embodiments, the two LSPs may be equal-cost multiple paths ("ECMPs"). The cost in determining whether multiple paths are equal cost may be path latency, jitter, delay, number of links, or other link/path attributes. In operation, packets may enter a LSP at the LSP ingress node from the customer edge ("CE") router CE1 and exit the LSP at the LSP egress router where they are sent to the customer edge router CE2.

Embodiments disclosed herein may be advantageously utilized in networks other that the network 100 shown in FIG. 1. For example, particular embodiments may include networks comprising multiple autonomous systems. Autonomous systems may be "stitched" together at routers commonly referred to as Autonomous System Border routers or AS-BRs. Thus, LSPs may be "stitched" together between autonomous systems and run the same BFD session end-to-end.

Figure 2:
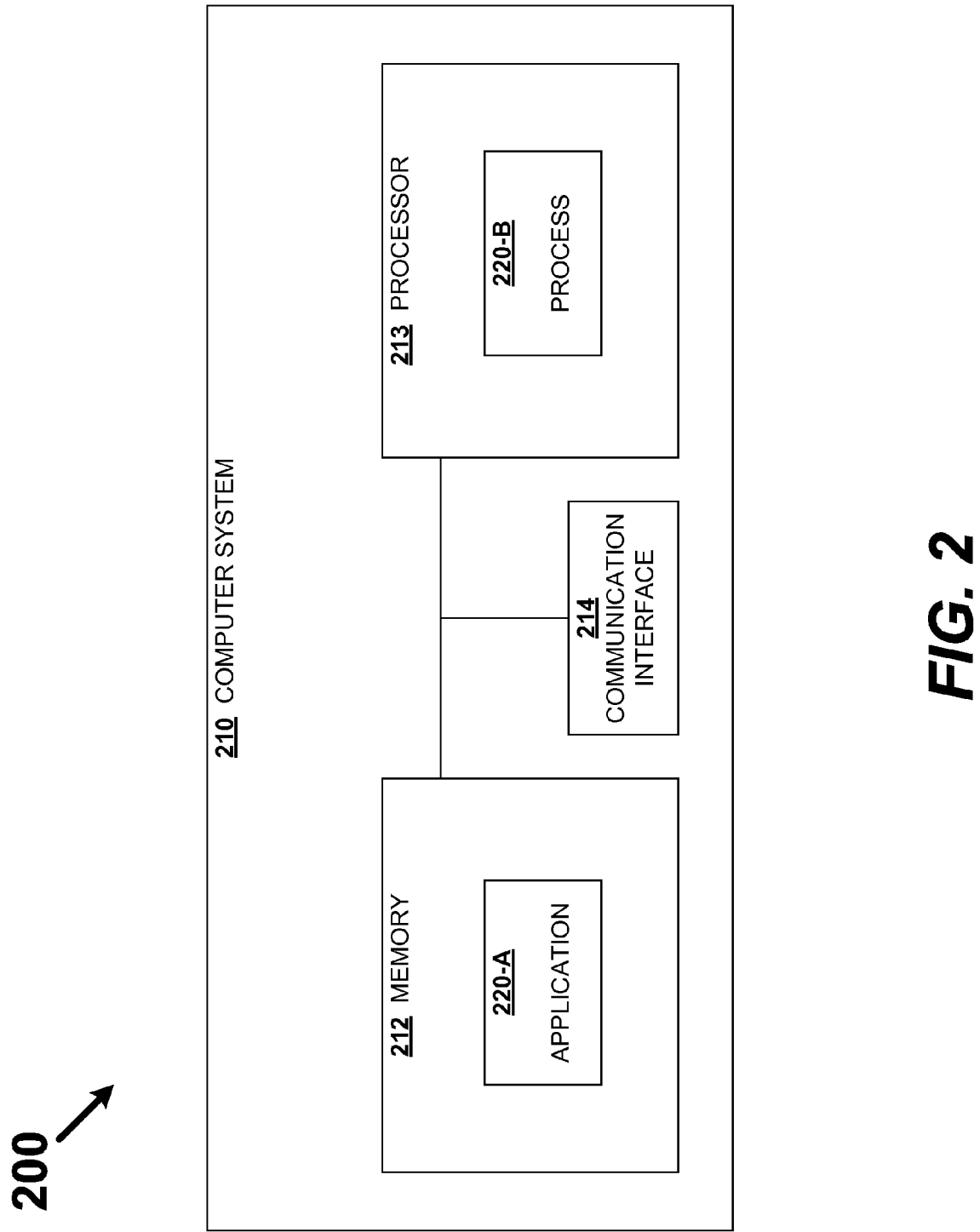
FIG. 2 illustrates an example computer system architecture for a computer system that performs operations useful in detecting LSP path failures in accordance with embodiments disclosed herein.

FIG. 2 illustrates an example computer system architecture 200 for a computer system 210 that performs operations useful in detecting LSP path failures in accordance with embodiments disclosed herein. The computer system 210 may be any type of computerized system such as a personal computer, workstation, portable computing device, mainframe, server, or the like. In this example, the computer system 210 includes an interconnection mechanism 211 that couples a memory system 212, a processor 213, and a communications interface 214. The communications interface 214 allows the computer system 210 to communicate with external devices or systems.

The memory system 212 may be any type of computer-readable medium that is encoded with an application 220-A that represents software code such as data and/or logic instructions (e.g., stored in the memory or on another computer-readable medium such as a disk) that embody the processing functionality of embodiments of the invention as explained above. The processor 213 can access the memory system 212 via the interconnection mechanism 211 in order to launch, run, execute, interpret, or otherwise perform the logic instructions of the application 220-A for the host in order to produce a corresponding process 220-B. In other words, the process 220-B represents one or more portions of the application 220-A performing within or upon the processor 213 in the computer system 210.

It is to be understood that embodiments of the invention include the applications (i.e., the un-executed or non-performing logic instructions and/or data) encoded within a computer-readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system 210 may include other processes and/or software and hardware components, such as an operating system, which have been left out of this illustration for ease of description of the invention.

Figure 3:
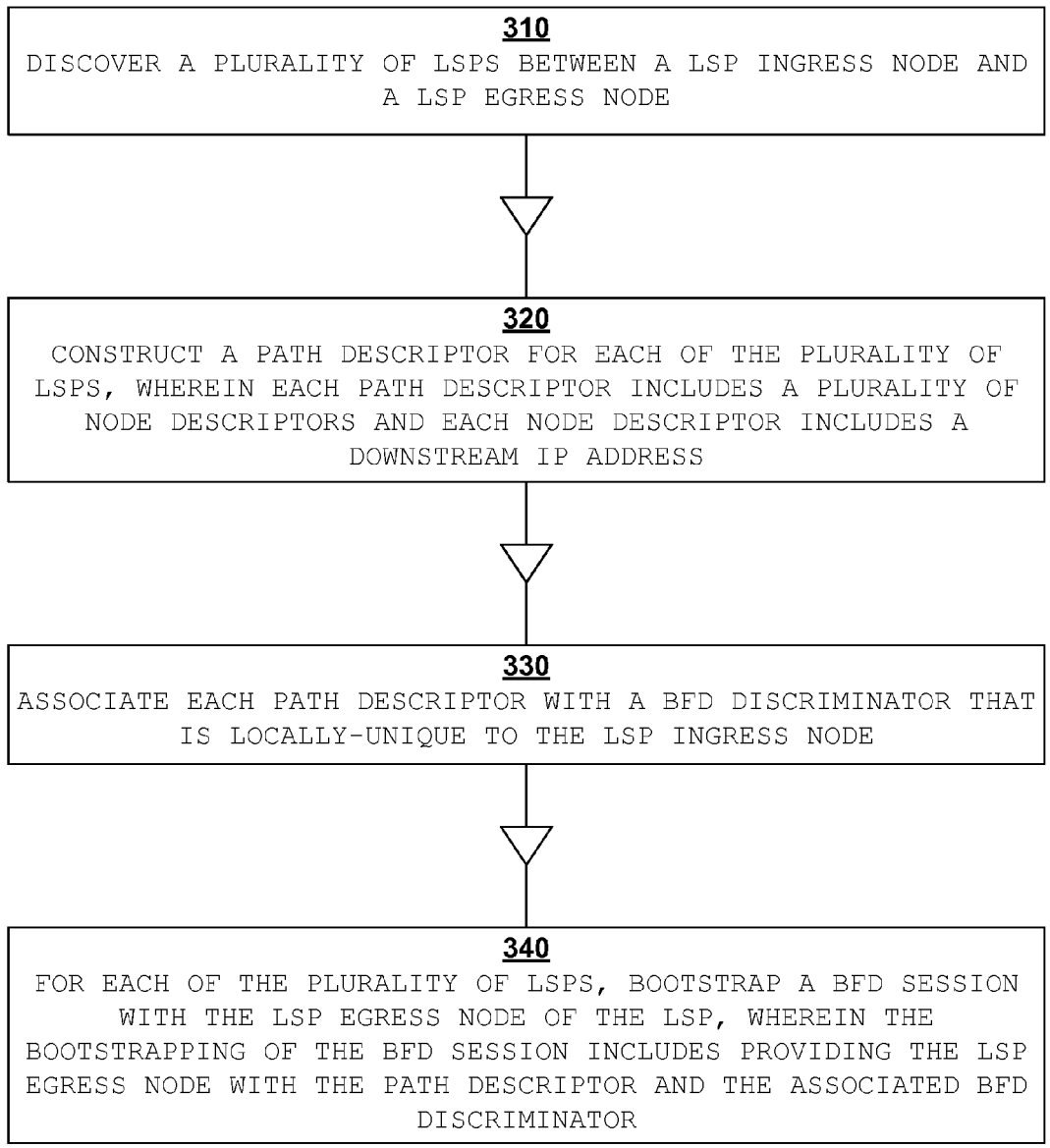
FIG. 3 illustrates example operations performable by a LSP ingress node and useful in detecting LSP path failures in accordance with embodiments disclosed herein.

FIG. 3 illustrates example operations 300 performable by a LSP ingress node and useful in detecting LSP path failures in accordance with embodiments disclosed herein. That is, the ingress node may comprise logic encoded in one or more tangible media for execution and, when executed, operable to perform the operations 300 illustrated in FIG. 3. For example, the LSP ingress node may be implemented by the computer system 210 of FIG. 2.

In step 310, a LSP ingress node discovers a plurality of label switched paths ("LSPs") between the LSP ingress node and a LSP egress node. In particular embodiments, the ingress node will discover all LSPs between the LSP ingress node and the LSP egress node. The LSP ingress node may use techniques known in the art for discovering multiple LSPs between the LSP ingress node and the LSP egress node. For example, the LSP ingress node may perform an ECMP Tree Trace as specified in RFC 4379 to discover all ECMPs for a Forwarding Equivalence Class ("FEC"). A FEC is used in MPLS to describe a set of packets with similar or identical characteristics that may be forwarded the same way. That is, the packets may be bound to the same MPLS label. Characteristics determining the FEC of a higher-layer packet depend on the configuration of the router, but typically this is at least the destination IP address. Quality of Service class is also often used. Thus, a FEC tends to correspond to a LSP. However, the reverse is not true. A LSP may be, and usually is, used for multiple FECs.

In step 320, the LSP ingress node constructs a path descriptor for each of the plurality of LSPs, wherein each path descriptor includes a plurality of node descriptors and each node descriptor includes a downstream IP address. In particular embodiments, each path descriptor may include other information in additional to the node descriptors. In particular embodiments, the node descriptor may include other information in addition to the downstream IP address. The precise format of the path descriptor may vary from embodiment to embodiment. In particular embodiments, the path descriptor is constructed in the form of a type-length-value ("TLV") entry. In step 330, the LSP ingress node associates each path descriptor with a BFD discriminator that is locally unique to the LSP ingress node.

In step 340, the LSP ingress node bootstraps a BFD session with the LSP egress node for each of the plurality of LSPs. Conventional technologies provide multiple means for bootstrapping a BFD session. Techniques for bootstrapping a BFD session include, for example, automatic bootstrapping using a protocol such as LSP ping, internal code detecting protocol/neighbor adjacency, or strictly manual. In embodiments disclosed herein, the bootstrapping of the BFD session includes providing the LSP egress node with the path descriptor and the associated BFD discriminator. The LSP ingress node may use different techniques, in different embodiments, for bootstrapping the BFD session and providing the LSP egress node with the path descriptor and the associated BFD discriminator. Thus, conventional techniques for bootstrapping a BFD session can be modified to provide the LSP egress node with the path descriptor and the associated BFD discriminator.

FIGS. 4 and 5 illustrate additional example operations performable by a LSP ingress node and useful in detecting LSP path failures in accordance with embodiments disclosed herein. In step 410, the LSP ingress node discovers a plurality of LSPs between the LSP ingress node and a LSP egress node. Step 410 comprises step 412. In step 412, the LSP ingress node performs a tree trace to discover all equal-cost multiple paths for a forwarding equivalence class. After step 410, the LSP ingress node performs step 320 and 330 as described above.

After step 330, the LSP ingress node performs step 540. In step 540, the LSP ingress node bootstraps a BFD session with the LSP egress node for each of the plurality of LSPs. The bootstrapping of the BFD session includes providing the LSP egress node with the path descriptor and the associated BFD discriminator. In particular embodiments, step 540 may comprise at least one of the steps in the group consisting of step 542, step 544, step 546, and step 548.

In step 542, the LSP ingress node sends a LSP-ping echo-request containing the path descriptor and the associated BFD discriminator to the LSP egress node. In response to the LSP-ping echo-request, the LSP egress node may send a LSP-ping echo-reply to the LSP ingress node. Other means of bootstrapping a BFD session may be used in other embodiments. For example, in particular embodiments static programming may be utilized to bootstrap a BFD session between the LSP ingress node and the LSP egress node.

In step 544, the LSP ingress node provides the LSP egress node with the path descriptor in a TLV entry. TLV entries are generally known in the art. In particular embodiments, step 544 may be combined with step 542. That is, the LSP ingress node may send, to the LSP egress node, a LSP-ping echo-request containing the path descriptor in a TLV entry. In step 546, the LSP ingress node provides the LSP egress node with the path descriptor in a TLV entry that also includes a field indicating the number of node descriptors in the path descriptor. In step 548, the LSP ingress node provides the LSP egress node with the path descriptor in a TLV entry that also includes a field indicating the address type and length (e.g., in number of octets) of the downstream IP addresses as well as the length (e.g., in number of octets) of any downstream interface fields.

Figure 6:
FIG. 6 illustrates an example time-length-value entry useful in detecting LSP path failure in accordance with embodiments disclosed herein.

FIG. 6 illustrates an example TLV entry 600 useful in detecting LSP path failures in accordance with embodiments disclosed herein. The TLV entry 600 includes an Address Type field 602. The Address Type field 602 contains a value that indicates the address type and length of the downstream IP addresses (i.e., IP address of nodes in the LSP, such as LSR-1A of FIG. 1) as well as the length of any downstream interface fields. For example, the Address Type field 602 may be set to one of the values shown in the rows of Table 1. Other address types, in addition to or in place of the types listed in Table 1 may be advantageously utilized in particular embodiments.

TABLE 1

| Type No. | Address Type | Octets |
|---|---|---|
| 1 | IPv4 Numbered | 16 |
| 2 | IPv4 Unnumbered | 16 |
| 3 | IPv6 Numbered | 40 |
| 4 | IPv6 Unnumbered | 28 |

The Number of Addresses field 604 in the TLV entry 600 contains a value indicating the number of IP Address/BFD Discriminator pairs in the TLV entry 600. The Downstream IP Address field 606 contains the IP Address of one of the nodes in the LSP. The Downstream IP Address field 608 contains the IP Address of another one of the nodes in the LSP. The TLV entry 600 may contain additional Downstream IP Addresses 610 so that the total number of IP Addresses in the TLV entry 600 equals the value in the Number of Addresses field 604.

FIG. 7 illustrates example operations 700 performable by a LSP egress node and useful in detecting LSP path failures in accordance with embodiments disclosed herein. That is, the ingress node may comprise logic encoded in one or more tangible media for execution and, when executed, operable to perform the operations 700 illustrated in FIG. 7. For example, the LSP egress node may be implemented by the computer system 210 of FIG. 2.

In step 710, a LSP egress node bootstraps a BFD session with a LSP ingress node of a LSP, wherein the bootstrapping includes receiving, from the LSP ingress node, a path descriptor for the LSP and a BFD discriminator associated with the path descriptor, wherein the path descriptor includes a plurality of node descriptors and each node descriptor includes a downstream IP address. In step 720, the LSP egress node detects a failure in the BFD session. The LSP egress node may use conventional techniques for detecting a BFD session failure. In step 730, the LSP egress node signals an alarm to indicate the detected failure, wherein the alarm includes the path descriptor for the LSP and the associated BFD discriminator.

FIG. 8 illustrates additional example operations performable by a LSP egress node and useful in detecting LSP path failures in accordance with embodiments disclosed herein. In step 810, a LSP egress node bootstraps a BFD session with a LSP ingress node of a LSP, wherein the bootstrapping includes receiving, from the LSP ingress node, a path descriptor for the LSP and a BFD discriminator associated with the path descriptor, wherein the path descriptor includes a plurality of node descriptors and each node descriptor includes a downstream IP address. Step 810 may comprise at least one of the steps in the group consisting of step 812, step 814, step 816, and step 818.

In step 812, the LSP egress node receives a LSP-ping echo-request containing the path descriptor and the associated BFD discriminator from the LSP ingress node. In particular embodiments, step 812 corresponds to step 542. For example, the LSP-ping echo-request sent by the LSP ingress node in step 542 may be the LSP-ping echo-request received by the LSP egress node in step 812.

In step 814, the LSP egress node receives, from the LSP ingress node, the path descriptor in a TLV entry. In particular embodiments, step 814 corresponds to step 544. For example, the TLV entry provided by the LSP ingress node in step 544 may be the TLV entry received by the LSP egress node in step 814.

In step 816, the LSP egress node receives, from the LSP ingress node, the path descriptor in a TLV entry that also includes a field indicating the number of node descriptors in the path descriptor. In particular embodiments, step 816 corresponds to step 546. For example, the TLV entry provided by the LSP ingress node in step 546 may be the TLV entry received by the LSP egress node in step 816.

In step 818, the LSP egress node receives, from the LSP ingress node, the path descriptor in a TLV entry that also includes an address-type field indicating the address type and length of the downstream IP addresses as well as the length of any downstream interface fields. In particular embodiments, step 818 corresponds to step 548. For example, the TLV entry provided by the LSP ingress node in step 548 may be the TLV entry received by the LSP egress node in step 818.

Having described preferred embodiments of the invention it will now become apparent to those of ordinary skill in the art that other embodiments incorporating these concepts may be used. Additionally, the software included as part of the invention may be embodied in a computer program product that includes a computer-readable medium. For example, such a computer-readable medium can include a readable memory device, such as a hard drive device, a CD-ROM, a DVD-ROM, or a computer diskette, having computer-readable program code segments stored thereon. The computer-readable medium can also include a communications link, either optical, wired, or wireless, having program code segments carried thereon as digital or analog signals.

Improved detection of specific BFD LSP path failures is herein disclosed. While the present invention has been shown and described herein with reference to specific embodiments thereof, it should be understood by those skilled in the art that variations, alterations, changes in form and detail, and equivalents may be made or conceived of without departing from the spirit and scope of the invention. Accordingly, the scope of the present invention should be assessed as that of the appended claims and by equivalents thereto.

What is claimed is:

1. A non-transitory tangible media for encoding logic for execution and, when executed, operable to perform operations of:
    discovering a plurality of paths between an ingress node and an egress node;
    constructing, by a processor, a plurality of path descriptors, wherein each path descriptor corresponds to one of the plurality of paths, and wherein each path descriptor includes a plurality of node descriptors and each node descriptor includes a downstream internet protocol ("IP") address;
    associating, by the processor, each path descriptor of the plurality of path descriptors with a Bidirectional Forwarding Detection ("BFD") discriminator that is locally-unique to the ingress node; and
    for each of the plurality of paths, bootstrapping a BFD session with the egress node, wherein the bootstrapping of the BFD session includes providing the egress node with the path descriptor and the associated BFD discriminator;
    detecting a failure in the BFD session; and
    sending an alarm in response to the failure of the BFD session, wherein the alarm includes the path descriptor and the associated BFD discriminator of the BFD session of the failure.

2. The non-transitory tangible media of claim 1, wherein the discovered plurality of paths comprise a plurality of label switched paths ("LSPs") and the egress node is a LSP egress node.

3. The non-transitory tangible media of claim 1, wherein discovering a plurality of paths comprises:
    performing a tree trace to discover all equal-cost multiple paths for a forwarding equivalence class.

4. The non-transitory tangible media of claim 2, wherein bootstrapping the BFD session comprises:
    sending a LSP-ping echo-request containing the path descriptor and the associated BFD discriminator to the LSP egress node.

5. The non-transitory tangible media of claim 2, wherein bootstrapping the BFD session comprises:
    providing the LSP egress node with the path descriptor in a type-length-value entry.

6. The non-transitory tangible media of claim 2, wherein bootstrapping the BFD session comprises:
    providing the LSP egress node with the path descriptor in a type-length-value entry that also includes a field indicating a number of node descriptors in the path descriptor.

7. The non-transitory tangible media of claim 2, wherein bootstrapping the BFD session comprises:
    providing the LSP egress node with the path descriptor in a type-length-value entry that also includes an address-type field indicating an address type and length of the downstream IP address and a length of any downstream interface fields.

8. An apparatus comprising:
    a non-transitory computer readable medium storing instructions;
    a processor for executing the instruction that when executed, are operable to perform operations of:
    bootstrapping a Bidirectional Forwarding Detection ("BFD") session with an ingress computer system of a path, wherein the bootstrapping includes receiving, from the path's ingress computer system, a path descriptor for the path and a BFD discriminator associated with the path descriptor, wherein the path descriptor includes a plurality of node descriptors and each node descriptor includes a downstream internet protocol ("IP") address;
    detecting a failure in the BFD session; and
    signaling an alarm to indicate the failure, wherein the alarm includes the path descriptor for the path and the associated BFD discriminator,
    wherein bootstrapping the BFD session comprises receiving, from the ingress computer system, the path descriptor in a type-length-value entry that also includes a field indicating a number of node descriptors in the path descriptor.

9. The apparatus of claim 8, wherein the path is a label switched path (LSP).

10. The apparatus of claim 8, wherein bootstrapping the BFD session comprises:
receiving a LSP-ping echo-request containing the path descriptor and the associated BFD discriminator from the ingress computer system.

11. The apparatus of claim 8, wherein bootstrapping the BFD session comprises:
receiving, from the ingress computer system, the path descriptor in a type-length-value entry.

12. The apparatus of claim 8, wherein bootstrapping the BFD session comprises:
receiving, from the ingress computer system, the path descriptor in a type-length-value entry that also includes an address-type field indicating an address type and length of the downstream IP addresses and a length of any downstream interface fields.

13. A method comprising:
identifying a first path including a first set of nodes between a label switched path (LSP) ingress node and an LSP egress node;
identifying a second path including a second set of nodes between the LSP ingress node and the LSP egress node;
constructing a first path descriptor describing the first set of nodes and a second path descriptor describing the second set of nodes, wherein the first path descriptor includes a field indicating how many nodes are in the first set of nodes;
sending, from the LSP ingress node to the LSP egress node, the first path descriptor associated with a first Bidirectional Forwarding Detection ("BFD") discriminator that is unique to the LSP ingress node; and
sending, from the LSP ingress node to the LSP egress node, the second path descriptor associated with a second BFD discriminator that is unique to the LSP ingress node.

14. The method of claim 13, wherein a LSP-ping echo-request contains the first path descriptor and the first BFD discriminator from the LSP ingress node.

15. The method of claim 13, wherein the first path descriptor includes a plurality of IP addresses each corresponding to one of the first set of nodes and the second path descriptor includes a plurality of IP address each corresponding to one of the second set of nodes.

* * * * *